United States Patent [19]

Chernack

[11] Patent Number: 4,808,639

[45] Date of Patent: Feb. 28, 1989

[54] LIQUID CURABLE ADHESIVE COMPOSITION COMPRISING A POLYESTER RESIN AND A MICROENCAPSULATED PEROXIDE CURING AGENT

[75] Inventor: Milton Chernack, West Hempstead, N.Y.

[73] Assignee: Production Previews, Inc., New York, N.Y.

[21] Appl. No.: 77,007

[22] Filed: Jul. 22, 1987

Related U.S. Application Data

[63] Continuation of Ser. No. 886,303, Jul. 16, 1986, abandoned.

[51] Int. Cl.$^4$ .................... C08K 9/10; C08K 9/12; C08L 63/00; C08G 63/76
[52] U.S. Cl. .................... 523/211; 523/440; 523/447; 525/27; 525/113; 528/93; 528/146
[58] Field of Search ............ 523/211, 440, 447; 525/27, 113; 528/91, 93, 146

[56] References Cited

U.S. PATENT DOCUMENTS

| | | | |
|---|---|---|---|
| 3,018,258 | 10/1962 | Meier | 523/211 |
| 3,395,105 | 7/1968 | Washburn et al. | 523/211 |
| 3,396,117 | 8/1968 | Schuetze | 523/211 |
| 3,993,815 | 11/1976 | Douek et al. | 528/75 |
| 4,228,251 | 10/1980 | Maekawa et al. | 525/27 |
| 4,233,204 | 11/1980 | Rubel | 523/211 |
| 4,503,161 | 3/1985 | Korbel et al. | 528/91 |
| 4,536,524 | 8/1985 | Hart et al. | 523/211 |

FOREIGN PATENT DOCUMENTS 223774 12/1984 Japan.

*Primary Examiner*—Harold D. Anderson
*Assistant Examiner*—Dennis R. Daley
*Attorney, Agent, or Firm*—Cohen, Pontani & Lieberman

[57] ABSTRACT

A liquid or viscous curable adhesive composition having a prolonged pot life which is composed of a liquid or viscous curable resin which has, preferably evenly and randomly dispersed therethroughout, a multiplicity of rupturable microcapsules containing a curing agent in an amount sufficient to cure the resin. The microcapsules are rupturable upon the application thereto of external pressure, or other mechanical manipulation. Upon rupture, the curing agent is released into coacting relationship with the curable resin and forms therewith an activated adhesive composition.

7 Claims, No Drawings

LIQUID CURABLE ADHESIVE COMPOSITION COMPRISING A POLYESTER RESIN AND A MICROENCAPSULATED PEROXIDE CURING AGENT

This is a continuation of U.S. application Ser. No. 886,303, filed July 16, 1986 now abandoned.

FIELD OF THE INVENTION

This invention relates to a liquid or viscous microcapsules-containing curable adhesive composition composed of a liquid curable resin which contains, dispersed therethroughout, a multiplicity of microencapsulated droplets of a curing agent, which microcapsules are rupturable upon the application of pressure, abrasive action, shear stress, or other mechanical manipulation. Specifically, this invention pertains to a liquid microcpsules-containing adhesive which is in liquid form when initially applied to the adherends or substrates to be joined and which is then cured by mechanical manipulation of the microcapsules containing the curing agent.

BACKGROUND ART

The most common method of joining a variety of substrates such as glass, rubber, leather, paper, porcelain, wood and metals is by application of an adhesive substance (often referred to as cement, glue or paste) to the respective adherends. Depending on the particular adhesive utilized, the glue or cement is applied to one or both of the substrates which are thereafter either immediately joined or, in the case of soluble adhesives, the solvent is allowed to evaporate until the adhesive has reached its desired tacky stage prior to joining of the substrates. In any event, the glue or cement has already reached, or is about to reach, its desired degree of tackiness—i.e. is an active adhesive composition—within a short time after application thereof so that the adherends must be set and joined with speed and precision immediately after the adhesive has been applied. This means that active adhesives have only a limited application life, also known as pot life. Moreover, the curing of the active adhesive, once exposed to air or mixed with the catalyst, proceeds to full cure without the possibility of being controlled in the sense of retarding, discontinuing or otherwise manipulating the curing process or re-setting the adherends. Once applied, conventional glues are also usually difficult to remove.

Some of the above-mentioned disadvantages have been partially overcome by incorporating minute, liquid-containing capsules into a perforated sheet material, the entrapped or enveloped liquid being released upon the application of pressure. Thus, U.S. Pat. No. 3,472,675 discloses a self-wetting sheet material which has a pattern of closely spaced perforations filled with a dried polymeric material in which microencapsulated droplets of solvents are incorporated. Also disclosed is a perforated sheet material in which each perforation is filled with a microencapsulated epoxy resin and catalyst. The sheet is dry to the touch and the two components are brought into coacting relationship by rupturing the microcapsules. However, once the microcapsules are ruptured, the components unite an are expressed as an active adhesive which must be utilized immediately since the curing reaction has been initiated.

A particular advantage of the adhesive composition of the present invention is that it may be applied with the same equipment used for surface coating—such as roller, flow, curtain and knife coaters—and that the point in time when the composition becomes an active adhesive by the application of external pressure, abrasive motion, shear stress or other mechanical manipulation which causes the microcapsules to rupture, thereby releasing the catalyst, can essentially be controlled by the user. Due to the substantially unlimited pot life of the instant adhesive composition, the joining of two adherends need not be rushed but may be conducted with more accuracy and precision.

One of the objects of the present invention is therefore to provide a curable adhesive composition which is applied in liquid or viscous form as, for example, by brushing or rolling upon a substrate, and which will not attain its activity (i.e. cure or harden) before the substrates are united as desired and after sufficient pressure is applied thereto.

Another object of the present invention is to provide an adhesive composition which, if mistakenly applied to a surface, can be easily removed therefrom by simply wiping off the yet inactive composition.

Microencapsulation is a known technique which therefore does not form a part of this invention separate and distinct from the composition as claimed. Microencapsulation is exemplified by the disclosure of U.S. Pat. Nos. 3,324,500; 3,472,675; 3,598,123; 3,640,629 and the above-mentioned reference. In addition, U.S. Pat. No. 3,686,701 discloses a cosmetic applicator containing rupturable microcapsules which contain both solvents for the removal of nail enamel and perfume to mask the odor of the solvents. And U.S. Pat. No. 3,691,270 discloses a cosmetic makeup removing composition incorporated in a flexible support throughout which ar distributed microcapsules containing the cosmetic makeup removing or treating composition.

SUMMARY OF THE INVENTION

The present invention relates to a liquid or viscous microcapsules-containing curable adhesive composition which is constituted of a liquid or viscous curable resin having, preferably evenly and randomly dispersed therethroughout, a multiplicity of rupturable microcapsules containing a curing agent in an amount sufficient to cure the resin. The microcapsules are rupturable upon the application thereto of external pressure, abrasive action, shear stress, or other mechanical manipulation. Upon rupture, the curing agent is released into coacting relationship with the curable resin and forms therewith an activated adhesive composition.

The term "uncured adhesive" or "curable resin" is meant to include, by way of nonlimiting example, uncured inorganic and organic adhesive substances, glues, pastes, rubber cements, cements, epoxy resins and the like which form the first, liquid curable component or components of the adhesive composition of the present invention. This first component is cured or hardened by the mixing and reaction with a second component which, when brought into coacting relationship with the first component, causes the resin to cure and harden. The application of heat often accelerates the curing process. Curing may, for example, be achieved by initiating and completing the polymerization of condensation products such as phenol-formaldehyde resins, resorcinol-formaldehyde resins, urea-formaldehyde resins, or melamin-formaldehyde resins with water as a by-product. Polymerization in situ without by-product formation is achieved by the addition of curing agents to polyesters, epoxies, urethanes, cyanoacrylates, conventional acrylics, vulcanizing rubbers and the like. Suitable curing agents, such as catalysts or polymerization initiators, which cause the curing of the liquid resin, are well known in the art. Liquid resins curable by condensation or by polymerization, i.e. so-called reaction-sensitive adhesives, are preferred since the strength of the bond is developed in the bond line after the two adherends have been brought together. As pointed out, some of the curing adhesives require heat, whereas others react at room temperature with the assistance of catalysts and, in some instances, with activation by light.

One embodiment of the present invention provides an adhesive composition in which a multiplicity of microencapsulated droplets of a curing agent are evenly distributed, throughout a liquid curable resin which is applied, for example by brushing, to the adherends or substrates. After the substrates have been precisely set and aligned as desired, they are pressed relatively together thereby rupturing the microcapsules and releasing the curing agent for interaction with the liquid resin to cure and harden the same. The adhesive compositions of the present invention are stable and have a long shelf life and pot life.

Other objects, features, and advantages of the invention will become apparent to those skilled in the art from the following detailed description of a preferred embodiment of the invention.

DETAILED DESCRIPTION OF THE PRESENTLY PREFERRED EMBODIMENT

The present invention relates to a liquid curable adhesive composition containing a liquid or viscous curable resin which incorporates, preferably evenly dispersed therethroughout, a multiplicity of microencapsulated droplets of a curing agent, such as a catalyst or reactive hardener, in an amount sufficient to cure the resin. Upon the application of pressure, abrasive action, shear stress or other mechanical manipulation, the microcapsules are ruptured whereupon the curing agent is released into coacting relationship with the resin to form an active adhesive which will thereafter cure and harden. Prior to rupturing of the microcapsules and release of the curing agent the adhesive composition is liquid or viscous so that it may easily be applied to the substrates or adherends. Fillers, such as quartz or metal powders for matching the expansion properties of substrates, or for contributing special thermal or electrical properties, or thixotropic agents for preventing flow of the adhesive into a porous ceramic and a silane coupling agent for ensuring long-term bond durability, may be incorporated therein. The adhesive composition should have low viscosity where it is required to penetrate small cracks or if to be used in very thin bond lines. Heavy bodied or thixotropic adhesives are required to fill gaps and resist sag in vertically-oriented applications.

As mentioned above, microencapsulation is well known in the art and therefore does not per se form a part of the present invention separate and distinct from the composition as claimed herein. Hence, any suitable known method may be used to divide the core material, here the curing agent, into minute liquid particles and to surround the divided curing agent particles by rupturable enveloping shells. In all microencapsulation methods, the curing agent, such as a catalyst or a reactive hardener, is divided into minute particles which are surrounded by rupturable envelopes, membranes or shells of suitable material. While many materials known in the art may be utilized in various microencapsulation processes, it is to be understood in assessing the suitability of the microcapsule shell material that the resulting shell must be sufficiently thin to rupture upon mechanical manipulation such as pressure, abraiding action, or shear stress. On the other hand, the shell material must be of sufficient thickness to prevent premature release of the curing agent during storage of the yet inactive adhesive composition and during its application to the substrates to be joined. It should also be understood that the shells of the microcapsules should be sufficiently thick and/or of suitable material to withstand any chemical attack or destruction by the uncured adhesive or by the encapsulated curing agent.

The range of applicability of microencapsulation processes is also extremely wide. Thus, if the core material is very fine, incorporation into a matrix of the coating material is appropriate. If the core material is an organic liquid, liquid-jet methods for the production of particles larger than a few hundred micrometers may be employed. If smaller particles are needed, coacervation techniques or interfacial polymerization may be utilized. If the core material or internal phase forms a stable emulsion in a polymer solution or a meltable medium, solidified particles of this emulsion may be prepared. If the core material is a highly polar liquid, microencapsulation is generally more difficult and may be achieved by the liquid-jet method, interfacial polymerization or phase-separation method. If the core and the desired shell material have similar solubilities, the core material is appropriately enveloped by matrix polymerization or emulsion solidification.

Suitable encapsulating or wall-forming materials include, but are not limited to, dextrin, gelatin, gum arabic, casein, parafin wax, natural waxes such as carnauba wax, beeswax, candelilla wax and Japan wax, acrylic resin, styrene-maleic acid, polyamide, polyethylene, polyethylene-ethyl cellulose mixtures, polyurethanes, polyesters, acetal homopolymers and copolymers, epoxy resins, cellulose acetophthalate and polypropylene. Any suitable wall material may be used provided the microcapsules formed therefrom are inert with respect to the action of both the entrapped curing agent as well as the liquid curable resin. In addition, the microcapsules should be impermeable to both the liquid resin and the curing agent to prevent premature release of one into the other thereby prematurely and undesirably initiating the curing process.

The diameter of the microcapsules is not critical to the invention and may, for example range from about 5 to about 1,000 microns, although the average particle size will generally be between 500 and 200 microns or less. Like the diameter, the thickness of the microcapsule shells is not critical to the invention, but should be sufficiently thick to maintain the liquid resin and the curing agent separate over a prolonged period of time and sufficiently thin to allow the microcapsules to rupture upon the application of pressure, abrasive action or other physical manipulation for release of the curing agent. The microcapsule shells should also be sufficiently thick to withstand the physical manipulation occurring during mixing and application of the adhesive composition to a substrate. A shell thickness of from about 1 to about 60 nm is sufficient.

For ease of preparation of the adhesive composition and to achieve an even distribution of the microcapsules therethroughout, the density of the liquid curable resin should be substantially equal to the density of the microcapsules. Substantial equal densities of the microcapsules and the surrounding liquid curable resin will assist in evenly distributing the microcapsules throughout the liquid curable resin and substantially prevent accidental rupture of the microcapsule during preparation of the composition.

As pointed out above, by the term liquid curable resin is meant the liquid or viscous component or components of the adhesive composition of the present invention which will not substantially change its physical state or phase but rather remains liquid or viscous unless intermixed with a second component or components of the adhesive composition. By the term active adhesive composition is meant the mixture of the liquid or viscous curable resin with the curing agent. As is well understood in the art, the useful application life—that is, the time period in which the active adhesive composition will cure or harden—is dependent, inter alia, on the amount of curing agent in the active composition. Upon its release from the ruptured microcapsules, the curing agent causes completion of the condensation or polymerization of synthetic resins such as phenol-formaldehyde condensates, urea-formaldehyde condensates, resorcinol-formaldehyde condensates, melamin-formaldehyde condensates, polyvinyl acrylates, epoxy resins and the like.

The selection of a proper adhesive is almost entirely empirical. For example, urea and formaldehyde react under alkaline or acidic conditions to mono- and di-methylol urea which are the precursors of insoluble solid adhesives. By condensing two moles urea and three moles formaldehydes in the presence of pyridine, ammonia or hexamethylene tetramine, a syrupy resin is obtained which is hardened by continued polymerization preferably at elevated temperatures. For example, resorcinol-formaldehyde resins cure at temperatures as low as 21° C. Novolacs are preferably formed with an acid catalyst such as oxalic acid. The phenol to formaldehyde ratio is approximately in the range of 1:0.8 to 1:1. Novolac resins keep indefinitely, for example, as a solution in organic solvents. Curing is effected by adding about 10 to about 15% of hexamethylene tetramine and preferably by heating the composition in the range of from about 120° to about 150° C. The choice of the proper phenolic resin adhesive depends on the required consistency in solution at the necessary solids content, the pot life of the mixture, the assembly time of the spread adhesive, the degree of extension necessary or desirable, the bonding time and the temperature, type of surface to be bonded and durability of the bond to be expected.

Also useful for the practice of the present invention are polyester resins together with the low temperature catalyst promoter system, methylethyl ketone (MEK) peroxide-cobalt naphthenate (CN). A large number of dicarboxylic acids and multifunctional alcohols may be used as components for the production of polyester resins. For example, diethylene glycol may be heated with maleic anhydrid to form a linear unsaturated polyester. Equally, one mole maleic anhydrid, one mole phthalic anhydrid and 2.2 moles propylene glycol result in a polyester of medium reactivity, while one mole maleic anhydrid, two moles phthalic anhydrid and 3.3 moles propylene glycol yield a polyester of low reactivity. The linear unsaturated polyester is thereafter reacted with a crosslinking agent such as styrene and mixed with a microencapsulated polymerization initiator which, upon destruction of the microcapsules and release of the initiator therefrom, causes polymerization and hardening of the adhesive. Other suitable crosslinking agents are vinyl toluene and alpha-methyl styrene. At least about 16% of styrene is necessary to furnish sufficient crosslinks, and usually about 28% or more is added. Unsaturated polyesters, acrylics and other monomer adhesives containing ethylenic unsaturation may also be cured by formation of free radicals when catalyzed by peroxides. The curing reaction may be accelerated by metal-ion donators such as cobalt and other metallic naphthenates. The base monomers usually contain inhibitors, such as hydroquinone or materials classed as stabilizers, to prevent premature cure. An inhibitor such as hydroquinone is commonly added at approximately 0.015% by weight of alkyd. The inhibitor retards the formation of free radicals. Ethylene glycol and diethylene glycol are frequently used as alcoholic components while maleic acid and fumaric acid are generally used as unsaturated dicarboxylic acids. As pointed out, the glycol is initially polycondensed with the dicarboxylic acid. The resin is thereafter dissolved in styrene and copolymerization is achieved with a peroxide catalyst which has been released from the microcapsules after rupture thereof. Thus, the liquid curable resin may be comprised of diethylene glycol, maleic anhydrid and styrene while the encapsulated peroxide catalyst is distributed therethroughout.

A preferred class of liquid curable resins are epoxy resins which cure by addition mechanism when basic materials such as amines, or acidic materials such as anhydrids, open the reactive oxirane ring structure. The curing agent or hardener may take part in the reaction or, as a tertiary amine, act as a catalyst to join the short monomer or polymer molecules to form large crosslinked structures. Acidic curing agents require elevated temperature and sometimes catalysts to complete the reaction in a reasonable time period. Adhesives based on epoxy resins are formed of linear polymers having terminal epoxy groups which continue to react during the hardening process. The liquid, curable resin is mostly composed of epichlorohydrin and bisphenol A which is produced by condensation of phenol and acetone. The yet liquid or viscous linear polymer with its terminal epoxy groups is thereafter cured by reaction with amines, such as diethylene triamine, or carboxylic acids or anhydrids such as phthalic acid anhydrid. Accordingly, the microencapsulated diethylene tramine curing agent is distributed, preferably evenly distributed, throughout the liquid or viscous linear polymer comprising the polyadduct of epichlorohydrin and bisphenol A. Epoxy resins can be formulated to give mixes of low viscosity with improved wetting, spreading and penetrating action. Epoxy resins are particularly advantageous because epoxy resin adhesives cure without releasing water or other condensation by-products. This makes it possible to bond the epoxy resin at only contact pressure, or with no pressure at all. Also, since there is no water to remove and no volatile solvent, epoxy resins are convenient for the bonding of impervious surfaces such as metals and glass. In addition, epoxy resins exhibit low shrinkage and low creep, i.e. cured epoxy resins, like other thermoset resins, maintain their shape under prolonged stress, are insensitive to moisture and exhibit resistance to most solvents. Epoxy resins are also effective barriers to heat and electric current and may be modified by selection of base resin and curing agent, alloying the epoxy resin with another resin or compounding the base resin with fillers.

Epoxy resins in which the average number of the repeating polymeric unit is less than 2, i.e. so-called bis-epi resins, are liquid and are particularly preferred adhesives for the purpose of this invention. Liquid bis-epi resins include aliphatic resins produced by condensation of epichlorohydrin with aliphatic polyols such as glycerin and modified resins produced by blending or reacting unmodified bis-epi resins with aliphatic polyepoxides, monoglycidyl ethers (allyl, butyl, phenyl), or plasticizers such as dibutyl phthalate. Liquid modified epoxy resins have viscosity in the range of from about 150 to about 6,000 cp at 23° C. while liquid bis-epi epoxy resins suitably have a viscosity from about 3,500 to about 32,000 cp at 23° C.

Suitable curing gents for liquid epoxy resins include, but are not limited to, diethylene tetramine, triethylene tetramine, diethylaminopropylamine, tris (dimethylaminomethyl) phenol (DMP30 Rohm & Haas), metaphenylendiamine, methylenedianiline, dicyandiamide, phthalic anhydride and the like. Whether the curing agent is a catalyst or reactive hardener, the cure results in an exotherm or an evolution of heat. In the casting of thick sections, the higher temperatures thus developed result in faster cures. In adhesive bonding, however, the glue line is ordinarily thin and the heat developed by the curing reaction is largely conducted away into the adherends. Consequently, the fastest hardeners are preferred if no heat is to be supplied to the adhesive joint from without.

The various aspects and modifications of the present invention will be further made apparent by reference to the following examples which are understood to be illustrative only and in no way limitative of the present invention. Unless otherwise indicated, the amounts of the ingredients in the following examples refer to parts by weight.

EXAMPLE 1

A liquid curable adhesive composition is prepared by intermixing, as component A, 74% by weight of Epon 828, (epoxy resin produced by the Shell Corporation comprising unmodified bisphenol A epoxy resin having a viscosity of from about 10,000 to about 20,000 cp at 23° C. and an epoxide equivalent weight of 185 to 192); 7.4% by weight of epoxide 7 reactive diluent (Procter & Gamble) which is a liquid aliphatic glycidyl ether as reactive diluent for the epoxy resin having an epoxide equivalent weight of 229; 3.8% by weight of Calidria Asbestos (RG-144 thickener/thixotrope, Union Carbide), a high purity short fiber chrysotile asbestos used as a thickener and thixotrope; and 14.8% by weight of silica (325 mesh).

As part B—the curing agent—37.0% by weight of Uni-rez 2,800 curing agent (Union Chem. Corp.), a low viscosity (200 to 500 cp) amido amine epoxy curing agent with an amine number of 445 is microencapsulated by the phase-separation method and evenly dispersed through the epoxy resin component.

EXAMPLE 2

100 parts by weight of Oxiron 2000 resin (viscosity, poise at 25° C. 1,800, specific gravity 1.010, epoxy percent 9.0, epoxide equivalent weight 177, hydroxyl percent 2.5 and iodine number 185) is mixed with 30.8% by weight of maleic anhydride and 7.9% of propylene glycol. The liquid resin is thereafter intermixed with 0.5% by weight of dicumyl peroxide as the core material of microcapsules produced by phase-separation methods. Cure time is about 2 hours at 80° C. with a post cure time of 3 hours at 120° C.

EXAMPLE 3

A liquid curable resin is prepared by intermixing oxirone 2001 resin (viscosity, poise at 25° C. 160, specific gravity 1.014, epoxy percent 11.0, epoxide equivalent weight 145, hydroxyl percent 2.0 and iodine number 154) with 35 parts by weight of maleic anhydrid, and 9.3 parts by weight of propylene glycol. 0.5 parts by weight of microencapsulated dicumyl peroxide is evenly dispersed throughout the resin. Cure time is 2 hours at 80° C. and post cure time is 3 hours at 150° C.

EXAMPLE 4

A liquid curable resin is produced by intermixing 100 parts by weight of oxirone 2000 resin (viscosity, poise at 25° C. 1800, specific gravity 1.010, epoxy percent 9.0, epoxide equivalent weight 177, hydroxyl percent 2.5 and iodine number 185) with 24 parts by weight of meta-phenylene diamine. 5 parts by weight of microencapsulated resorcinol is evenly dispersed throughout the resin. Cure time comprises 1 hour at 100° C. and post cure time is 3 hours at 155° C.

EXAMPLE 5

A general purpose adhesive for resilient bonds and good low temperature characteristics is produced by blending 100 parts by weight of a liquid epoxy resin (Araldite 6020, Ciba) with 50 parts by weight of a liquid polysulfide resin (Thiokol LP-3, Thiokol Corp.). Evenly dispersed throughout the resin blend are 10 parts by weight of microencapsulated DNAPA (dimethyl amino proplyamine). After a cure of 1 hour at 100° C., the tensile shear strength (psi) is as follows: at −40° C., 870–1885 psi; at 20° C., 1740–3200 psi; and at 70° C., 145–290 psi.

EXAMPLE 6

Another tough, general-purpose adhesive for resilient bonds and good low temperature characteristics is produced by blending 100 parts by weight of Araldite 6020 with 50 parts by weight of Thiokol LP-3. 6 parts by weight of microencapsulated DMP 30 (tris (dimethylamino methyl) phenol, General Chemical Div. Allied Chemical Corporation) is evenly distributed throughout the resin. After a cure of 1 hour at 100° C. the tensile shear strengths (psi) are as follows: at −40° C., 2180–2470 psi; at 20° C., 2470–3200 psi; and at 70° C., 580–725 psi.

EXAMPLE 7

A liquid curable resin is prepared by mixing 100 parts by weight of Epon 826 (Shell) having a viscosity of 7000–8000 cp at 23° C. and an epoxide equivalent of 175–190, with 70 parts by weight of microencapsulated Lancast A (Ciba), a high molecular weight aliphatic polyamine as reactive hardener, resulting in a resin with great peal strength.

The invention may be embodied in other specific forms without departing from the spirit or essential characteristics thereof. The present embodiments are therefore to be construed in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A liquid curable adhesive composition having a prolonged pot life comprising a polyester resin as a liquid curable resin; and microencapsulated peroxide as a curing agent dispersed throughout said resin in an amount sufficient to cure said resin, said microcapsules being rupturable upon the application of pressure for releasing said agent and curing said adhesive composition; said resin and said curing agent being nonreactive with said microcapsules.

2. The adhesive composition of claim 1, wherein the polyester is a polymerizable acrylic ester.

3. The adhesive composition of claim 2, wherein the acrylic ester is a cyanoacrylate.

4. The adhesive composition of claim 1, additionally comprising fillers, thixotropic agents, a coupling agent or mixture thereof.

5. The adhesive composition of claim 1, wherein the diameter of the microcapsules is between about 5 and about 1000 microns.

6. The adhesive composition of claim 1, wherein the microcapsules have a shell thickness of from about 1 to about 60 nm.

7. The adhesive composition of claim 1, wherein the density of the liquid curable resin is substantially equal to the density of the microcapsules.